April 1, 1958     H. OBERBECK     2,829,248
IMPULSE COMPARING ARRANGEMENT

Filed July 3, 1952                    2 Sheets-Sheet 1

3b

3c

3d

3e

Inventor:
Helmut Oberbeck
by Michael S. Striker
Attorney

April 1, 1958 H. OBERBECK 2,829,248
IMPULSE COMPARING ARRANGEMENT
Filed July 3, 1952 2 Sheets-Sheet 2
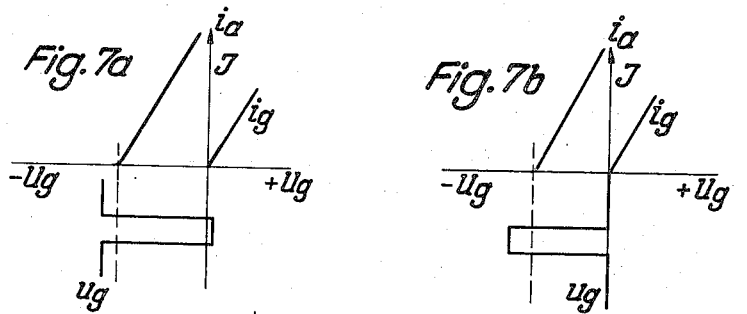
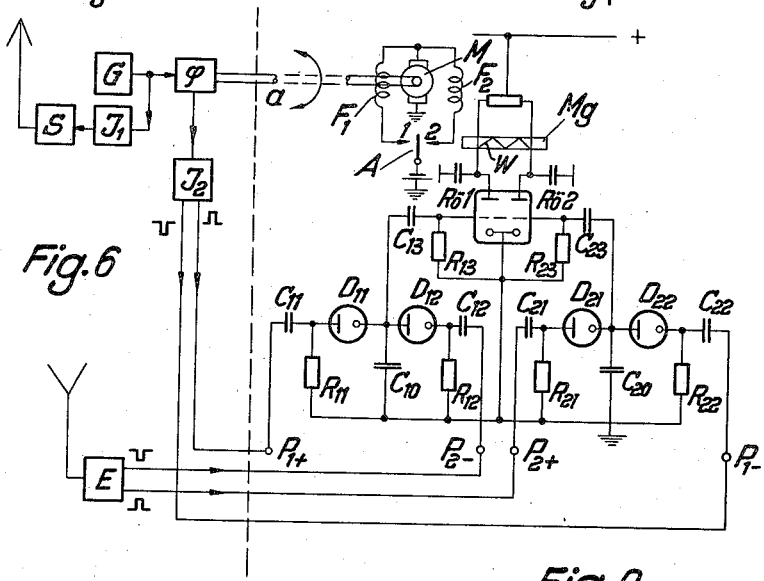
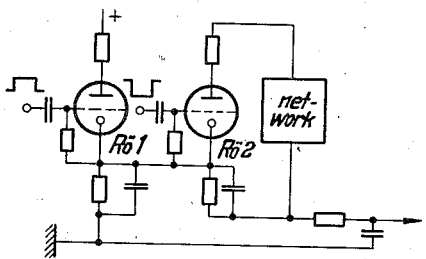
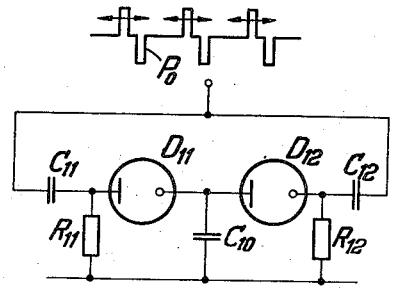
Inventor:
Helmut Oberbeck
by Michael S. Striker
Attorney United States Patent Office 2,829,248
Patented Apr. 1, 1958

2,829,248
IMPULSE COMPARING ARRANGEMENT
Helmut Oberbeck, Ulm (Danube), Germany
Application July 3, 1952, Serial No. 297,143
Claims priority, application Germany July 7, 1951
12 Claims. (Cl. 250—27)

The present invention relates to an arrangement for comparing impulses with each other, and more particularly to an arrangement for deriving a controlling quantity such as a control voltage from the relative phase position of two impulse sequences having equal sequence frequencies.

It is an object of the present invention to provide a comparing arrangement of the type described which is simple and sturdy.

It is another object of the present invention to provide a comparing arrangement which is reliable in operation.

It is a further object of the present invention to provide a comparing arrangement giving a clear indication of the relative phase position of the impulse sequences.

It is still another object of the present invention to provide a comparing device allowing to adjust automatically the phase position of the two impulse sequences in a predetermined manner.

An arrangement according to the present invention comprises in its broadest aspect in combination, a first unidirectional conductor, a second unidirectional conductor connected in series with the first unidirectional conductor so as to form a junction, a condenser having two plates, one of the plates being connected to a common reference potential, the other of the two plates being connected to the junction of the unidirectional conductors, a first coupling member connected to the first unidirectional conductor, the first coupling member being fed with one of the two impulse sequences, and a second coupling member connected to the second unidirectional conductor, the second coupling member being fed with the other of the two impulse sequences with opposite polarity to the one of the two impulse sequences whereby the two impulse sequences alternately charge and discharge the condenser so as to produce impulse-shaped voltages across the condenser serving as a criterion for the mutual phase position of the two impulse sequences.

Preferably the unidirectional conductors are formed by rectifying devices such as diodes.

In a preferred embodiment of the present invention the coupling members are formed by circuits including each a resistor and a capacitor and having large time constants.

A preferred embodiment of the present invention comprises a high ohmic load circuit connected to the junction of the unidirectional conductors and having a member, such as a tube and a coupling circuit connecting the grid of the tube to the junction, for evaluating the peak voltage of the impulse-shaped voltage across the condenser.

In one embodiment of the present invention the arrangement is duplicated by including a third unidirectional conductor, a fourth unidirectional conductor connected in series with the third unidirectional conductor so as to form a second junction, a second condenser having two plates, one of the plates of the second condenser being connected to the common reference potential, the other of the two plates of the second condenser being connected to the second junction of the third and fourth unidirectional conductors, a third coupling member connected to the third unidirectional conductor, the third coupling member being fed with the other of the two impulse sequences with opposite polarity, and a fourth coupling member connected to the fourth unidirectional conductor, the fourth coupling member being fed with the one of the two impulse sequences with opposite polarity, whereby the two impulse sequences alternately charge and discharge the second condenser in opposition to the first condenser so as to produce across the condensers opposite impulse-shaped voltages.

Preferably in this embodiment a first and a second tube having grids connected, respectively, to the junctions of the unidirectional conductors are provided together with a polarized relay connected in the anode circuits of the first and second tubes, a phase-correcting member being actuated by the polarized relay, preferably over a motor.

According to another embodiment of the present invention the first and second coupling members are connected to each other so as to form a junction fed with an impulse sequence being a superposition of the two impulse sequences.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 2, 3a to 3e and 4 are diagrams for explaining the operation of the arrangement shown in Fig. 1;

Fig. 6 is a wiring diagram of a further embodiment of the present invention;

Figs. 7a and 7b are diagrams for explaining the operation of the arrangement shown in Fig 5;

Fig. 8 is a wiring diagram of still another embodiment of the present invention; and Fig. 9 is a wiring diagram of a modification of the arrangement shown in Fig. 1.

Figure 1:
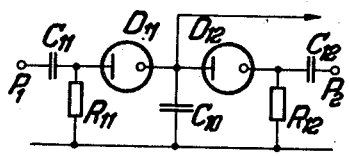
Fig. 1 is a wiring diagram of a first embodiment according to the present invention.
Figure 2:
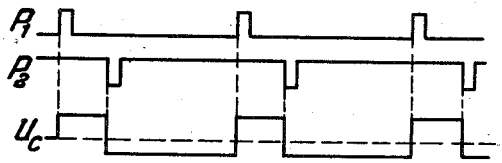

Referring now to the drawings and first to Fig. 1, the arrangement comprises two unidirectional conductors such as diodes $D_{11}$ and $D_{12}$ connected in series with each other, i. e. the cathode of the diode $D_{11}$ is connected to the anode of the diode $D_{12}$ so as to form a junction. A condenser $C_{10}$ has two plates, one of which is connected to a common reference potential, e. g. ground or the mass. The other plate of the condenser $C_{10}$ is connected to the junction of the diodes $D_{11}$, $D_{12}$. The anode of the diode $D_{11}$ is connected to ground of the mass by a first resistor $R_{11}$ which forms together with a first capacitor $C_{11}$ connected to the anode of the diode $D_{11}$ a first coupling member or a circuit having a large time-constant. A first series of impulses $P_1$ is applied to the circuit $C_{11}$, $R_{11}$ as indicated in Fig. 1. The impulse series $P_1$ has a predetermined frequency of succession as shown in Figs. 2 and 3a to 3e. The cathode of the diode $D_{12}$ is connected to a second coupling member or circuit having a large time-constant and including a second resistor $R_{12}$ and a second capacitor $C_{12}$. A second impulse series $P_2$ is applied to the second coupling circuit and has, as shown in Fig. 2, the same frequency of succession as the first impulse series $P_1$ but a phase position which is as a rule different from the phase position of the first impulse series $P_1$.

The operation of this device is as follows:

The first impulse series $P_1$ is applied to the large time-constant circuit $R_{11}$, $C_{11}$ connected to the anode of the diode $D_{11}$ whereas the second impulse series $P_2$ is applied to the large time-constant circuit $R_{12}$, $C_{12}$ connected to the cathode of the diode $D_{12}$. In consequence thereof the condenser $C_{10}$ is charged by the impulses forming one impulse series and is discharged when the impulses of the other impulse series arrive. Fig. 2 shows the two impulse series $P_1$ and $P_2$ having the same frequency of succession but different phases, and below the impulse series $P_1$, $P_2$ the voltage $U_c$ across the plates of the condenser $C_{10}$ which is obtained in Fig. 1 between ground and the line indicated by the arrow.

Figs. 3a to 3e illustrate the charging condition or the voltage across the condenser $C_{10}$ for different relative phase positions of the first and second impulse series $P_1$ and $P_2$. As will be seen from these figures, a phase shift occurs when the phase of the second impulse series $P_2$ changes from lead to lag so that the impulses generated across the condenser $C_{10}$ have a negative part for the leading phase and a positive part for the lagging phase, the negative and positive parts of the voltage being the larger the larger the phase difference between the first and second impulse series $P_1$, $P_2$ is. If the impulse series $P_1$, $P_2$ are in counterphase, the voltage across the condenser $C_{10}$ is reduced to zero as indicated by the abscissa $t_0$ shown in Fig. 3c.

Figure 4:
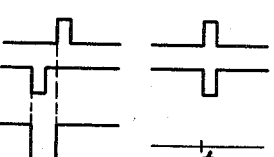
Figure 4:
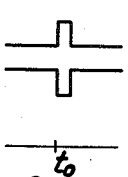
Figure 4:
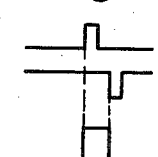
Figure 4:
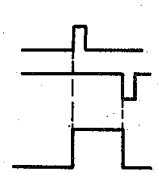
Figure 4:
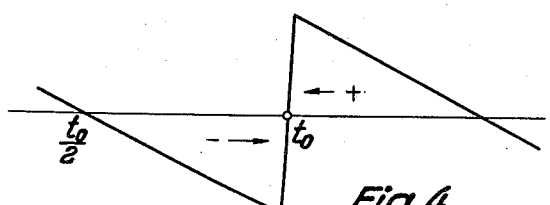

It should be understood that the arrangement according to Fig. 1 should be used with a high ohmic load circuit in order to obtain a charging of the condenser $C_{10}$ to approximately constant values between the subsequent impulses so that a characteristic as shown in Fig. 4 is obtained. Fig. 4 indicates clearly the phase shift at the abscissa $t_0$. The condenser $C_{10}$ should be sufficiently small so that it is charged completely within the duration of a single impulse.

However, the very advantageous characteristic shown in Fig. 4 can only be approximated with formation of the D. C. mean values of the impulse-shaped voltages shown in Figs. 3a to 3e because these D. C. mean values are too small at the pulsing conditions to carry out a control therewith.

Figure 3A:
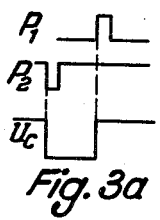

It is a further object of the present invention to provide a control arrangement which allows directly to utilize the phase shift, that is, the shift from negative impulses as shown in Fig. 3b to positive impulses as shown in Fig. 3d, which results at the relative shifting of the two impulse series from phase lead to phase lag. This is accomplished by connecting the arrangement shown in Fig. 1 to a high ohmic load circuit which is designed so that the impulses $U_c$ shown in Fig. 3a are supplied to the load circuit over a member evaluating the impulse-shaped peak voltage across the condenser $C_{10}$.

Figure 5:
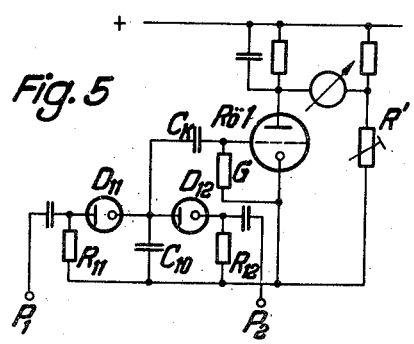
Fig. 5 is a wiring diagram of another embodiment of the present invention.

Referring now to Fig. 5 of the drawings showing an arrangement of this kind, the load circuit connected to the arrangement including the diodes $D_{11}$, $D_{12}$ comprises a tube $Ro1$ including a grid connected to a coupling circuit including grid leakage resistor G and a condenser $C_k$ connected to the junction of the diodes $D_{11}$, $D_{12}$ to which one plate of the condenser $C_{10}$ is connected. The values of the grid leakage resistor G and the condenser $C_k$ are so chosen that a time-constant results which is large as compared to the periods of the impulses forming the two impulse sequences.

The operation of this device is as follows:

As shown in Fig. 7a at positive impulses the operating point of the tube $Ro1$ is shifted beyond the knee of the characteristic of the tube into the negative range because of the starting of a grid current owing to the circuit $C_k$, G. Thus the tube $Ro1$ is practically always blocked except during the time when the short positive impulses occur. On the other hand Fig. 7b shows that the tube $Ro1$ is permanently conductive during the occurrence of negative impulses except for the short duration of these negative impulses. The control voltage is derived from a RC member connected in the anode circuit of the tube $Ro1$. Furthermore, the embodiment shown in Fig. 5 has an arrangement for indicating the anode current with compensation of the idle anode current by means of an adjustable resistor R'.

Referring now to Fig. 6 the resistor R' shown in Fig. 5 is replaced by a second tube $Ro2$ which is controlled so as to work in opposition to the first tube $Ro1$ so that the stability, the safety of operation and the slope of the control curve are increased. As shown in Fig. 6, two sets of diodes $D_{11}$, $D_{12}$ and $D_{21}$, $D_{22}$ termed hereinafter, respectively, the first, second, third and fourth diodes are provided, the diodes $D_{11}$, $D_{12}$ and $D_{21}$, $D_{22}$ are connected in series, respectively, and supplied with the impulse series $P_1$ and $P_2$; however, the polarity of the impulse series supplied to the second set $D_{21}$, $D_{22}$ is reversed against the polarity of the impulse series supplied to the first set $D_{11}$, $D_{12}$. In consequence thereof the condensers $C_{10}$ and $C_{20}$ termed hereinafter the first and second condensers, respectively, are charged by impulse voltages having opposed polarities which control the tubes $Ro1$ and $Ro2$ in opposition to each other. The inequality of the mean anode currents of the tubes $Ro1$ and $Ro2$ is the measure of the asymmetry of the impulse voltages and thus of the phase difference between the original impulse sequences. The inequality of the mean anode currents can be utilized according to Fig. 6 by influencing a polarized relay indicated in Fig. 6 or an equivalent switching arrangement or an instrument. The polarized relay shown in Fig. 6 has the task of controlling a motor for adjusting the phases of one impulse sequence relative to the other.

Referring now to Fig. 8, a purely electrical control is shown. One tube $Ro2$ is operated from a separate network so that the difference of the two voltages occurring across the cathode resistors of the tubes $Ro1$ and $Ro2$ can be used as a controlling voltage. The thus obtained controlling quantity has to be fed to a controlling member such as an idle tube (German Blindrohre—not shown) in order to carry out an afteradjustment of the impulse voltage to be controlled. However, the control is better carried out in this case by deriving the impulses from a sinusoidal voltage and biassing the grid of the tube fed with the sinusoidal voltage, by the controlling voltage. In this way it is accomplished that the point of intersection of the sinusoidal voltage with the predetermined grid voltage is shifted according to the controlling quantity so that simultaneously the phase of the impulse derived from this point of intersection is shifted in a corresponding manner.

The diodes can be replaced by other unidirectional current conductors e. g. by dry-plate rectifiers such as copper oxide rectifiers, selenium rectifiers, crystal detectors, grid controlled electron tubes, or the like.

Referring now to Fig. 9 showing a modified embodiment of Fig. 1, the plate of the condenser $C_{11}$, not connecte with the anode of diode $D_{11}$ is connected in series with the plate of the condenser $C_{12}$ which is not connected to the cathode of diode $D_{12}$ so as to connect the first coupling member $R_{11}$, $C_{11}$ to the second coupling member $R_{12}$, $C_{12}$. The junction of the plates of the condensers $C_{11}$ and $C_{12}$ is fed with a sequence $P_0$ of double impulses being a superposition of the two impulse sequences $P_1$, $P_2$ and consisting of alternating positive and negative impulses, the positive impulses lying shortly before or after the negative impulses or shifting between the two end positions. Such impulse sequences occur, for instance, with radio-beacon receivers and produce in the arrangement shown in Fig. 9 on the condenser $C_{10}$ positive or negative impulses or no impulse at all according as the positive impulses of the double impulse sequence $P_0$ are situated before or after the negative impulses thereof or coincide with the latter so that they entirely or partly cancel each other. The devaluation of the impulses generated at the condenser $C_{10}$ is carried out in the same manner as described hereinabove.

It will be understood that each of the elements described above, or two or more together, may also find a useful application in other types of arrangements for comparing impulses with each other differing from the types described above.

While the invention has been illustrated and described as embodied in an arrangement for deriving a controlling quantity from the relative phase position of two impulse sequences, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for deriving a controlling quantity from the relative phase position of two impulse series having equal repetition frequencies, comprising, in combination, a first unidirectional conducting means; a second unidirectional conducting means connected in series with said first unidirectional conducting means so as to form a junction; a common reference potential source; a condenser having two plates, one of said plates being connected to said common reference potential, the other of said two plates being connected to said junction of said unidirectional conducting means, said junction being connected to said reference potential solely through said condenser; a first coupling member connected to said first unidirectional conducting means and having an input terminal adapted to be connected to one of said two impulse series; and a second coupling member connected to said second unidirectional conducting means and having an input terminal adapted to be connected to the other of said two impulse series with opposite polarity to said one of said two impulse series whereby said two impulse series alternately charge and discharge said condenser so as to produce impulse-shaped voltages across said condenser proportional to the mutual phase position of said two impulse series.

2. An arrangement for deriving a controlling quantity from the relative phase position of two impulse series having equal repetition frequencies, comprising, in combination, a first diode having a cathode and an anode; a second diode having a cathode and an anode, said cathode of said first diode being connected to said anode of said second diode so as to form a junction; a source of common reference potential; a condenser having two plates, one of said plates being connected to said source of common reference potential, the other of said two plates being connected to said junction of said cathode of said first diode and said anode of said second diode, said junction being connected to said reference potential solely through said condenser; a first coupling member connected to said anode of said first diode and having an input terminal adapted to be connected to one of said two impulse series for charging said condenser; and a second coupling member connected to said anode of said cathode of said second diode and having an input terminal adapted to be connected to the other of said two impulse series with opposite polarity to said one of said two impulse series for discharging said condenser to produce voltage impulses across said condenser proportional to the mutual phase position of said two impulse series.

3. An arrangement for deriving a controlling quantity from the relative phase position of two impulse series having equal repetition frequencies, comprising, in combination, a first unidirectional conducting means; a second unidirectional conducting means connected in series with said first unidirectional conducting means so as to form a junction; a source of common reference potential; a condenser having two plates, one of said plates being connected to said common reference potential, the other of said two plates being connected to said junction of said unidirectional conducting means, said junction being connected to said reference potential solely through said condenser; a first coupling circuit including a first resistor and a first capacitor and being connected to said first unidirectional conducting means, said first coupling circuit having an input terminal adapted to be connected to one of said two impulse series; and a second coupling circuit including a second resistor and a second capacitor and being connected to said second unidirectional conducting means, said second coupling circuit having an input terminal adapted to be connected to the other of said two impulse series with opposite polarity to said one of said two impulse series whreby said two impulse series alternately charge and discharge said condenser so as to produce impulse-shaped voltages across said condenser proportional to the mutual phase posiiton of said two impulse series.

4. An arrangement for deriving a controlling quantity from the relative phase position of two impulse series having equal repetition frequencies, comprising, in combination, a first unidirectional conducting means; a second unidirectional conducting means connected in series with said first uidirectional conducting means so as to form a junction; a source of common reference potential; a condenser having two plates, one of said plates being connected to said common reference potential, the other of said two plates being connected to said junction of said unidirectional conducting means, said junction being connected to said reference potential solely through said condenser; a first large time-constant coupling member connected to said first unidirectional conducting means and having an input terminal adapted to be connected to one of said two impulse series; and a second large time-constant coupling member connected to said second unidirectional conducting means and having an input terminal adapted to be connected to the other of said two impulse series with opposite polarity to said one of said two impulse series whereby said two impulse series alternately charge and discharge said condenser so as to produce impulse-shaped voltages across said condenser proportional to the mutual phase position of said two impulse series.

5. An arrangement for deriving a controlling quantity from the relative phase position of two impulse series having equal repetition frequencies, comprising, in combination, a first unidirectional conducting means; a second unidirectional conducting means connected in series with said first unidirectional conducting means so as to form a junction; a source of common reference potential; a condenser having two plates, one of said plates being connected to a common reference potential, the other of said two plates being connected to said junction of said unidirectional conducting means, said junction being connected to said reference potential solely through said condenser; a first coupling member connected to said first unidirectional conducting means and having an input terminal adapted to be connected to one of said two impulse series; a second coupling member connected to said second unidirectional conducting means, said second coupling member having an input terminal adapted to be connected to the other of said two impulse series with opposite polarity to said one of said two impulse series whereby said two impulse series alternately charge and discharge said condenser so as to produce impulse-shaped voltages across said condenser proportional to the mutual phase position of said two impulse series; and a load circuit having a high resistive impedance connected to said junction, said load circuit having indicating means for indicating the peak voltage of the impulse-shaped voltage across said condenser.

6. An arrangement for deriving a controlling quantity from the relative phase position of two impulse series having equal repetition frequencies, comprising, in combination, a first diode having a cathode and an anode; a second diode having a cathode and an anode, said cathode of said first diode being connected to said anode of said second diode so as to form a junction; a source of common reference potential; a condenser having two plates, one of said plates being connected to said common reference potential, the other of said two plates being connected to said junction of said cathode of said first diode and said anode of said second diode, said junction being connected to said reference potential solely through said condenser; a first coupling member connected to said anode of said first diode, said first coupling member having an input terminal adapted to be connected to one of said two impulse series; a second coupling member connected to said cathode of said anode of said second diode, said second coupling member having an input terminal adapted to be connected to the other of said two impulse series whereby said two impulse series alternately charge and discharge said condenser so as to produce impulse-shaped voltages across said condenser proportional to the mutual phase position of said two impulse series; and a load circuit having a high resistive impedance connected to said junction, said load circuit having indicating means for indicating the peak voltage of the impulse-shaped voltage across said condenser.

7. An arrangement for deriving a controlling quantity from the relative phase position of two impulse series having equal repetition frequencies, comprising, in combination, a first unidirectional conducting means; a second unidirectional conducting means connected in series with said first unidirectional conducting means so as to form a junction; a source of common reference potential; a condenser having two plates, one of said plates being connected to said common reference potential, the other of said two plates being connected to said junction of said unidirectional conducting means, said junction being connected to said reference potential solely through said condenser; a first coupling member connected to said first unidirectional conducting means, said first coupling member having an input terminal adapted to be connected to one of said two impulse series; a second coupling member connected to said second unidirectional conducting means, said second coupling member having an input terminal adapted to be connected to the other of said two impulse series with opposite polarity to said one of said two impulse series whereby said two impulse series alternately charge and discharge said condenser so as to produce impulse-shaped voltages across said condenser proportional to the mutual phase position of said two impulse series; and a load circuit having a high resistive impedance connected to said junction, said load circuit including a tube having a control grid and a coupling circuit connecting said control grid of said tube to said junction, said coupling circuit having a time-constant being large in comparison to the periods of the impulses forming said impulse series.

8. An arrangement for deriving a controlling quantity from the relative phase position of two impulse series having equal repetition frequencies, comprising, in combination, a first unidirectional conducting means; a second unidirectional conducting means connected in series with said first unidirectional conducting means so as to form a first junction; a source of common reference potential; a first condenser having two plates, one of said plates of said first condenser being connected to said common reference potential, the other of said two plates of said first condenser being connected to said first junction of said first and second unidirectional conducting means, said first junction being connected to said reference potential solely through said first condenser; a first coupling member connected to said first unidirectional conducting means, said first coupling member having an input terminal adapted to be connected to one of said two impulse series; a second coupling member connected to said second unidirectional conducting means, said second coupling member having an input terminal adapted to be connected to the other of said two impulse series with opposite polarity to said one of said two impulse series whereby said two impulse series alternately charge and discharge said first condenser so as to produce impulse-shaped voltages across said first condenser proportional to the mutual phase position of said two impulse series; a third unidirectional conducting means; a fourth unidirectional conducting means connected in series with said third unidirectional conducting means so as to form a second junction; a second condenser having two plates, one of said plates of said second condenser being connected to said common reference potential, the other of said two plates of said second condenser being connected to said second junction of said third and fourth unidirectional conducting means, said second junction being connected to said reference source solely through said second condenser; a third coupling member connected to said third unidirectional conducting means, said third coupling member having an input terminal adapted to be connected to said other of said two impulse series with opposite polarity; and a fourth coupling member connected to said fourth unidirectional conducting means, said fourth coupling member having an input terminal adapted to be connected to said one of said two impulse series with opposite polarity, whereby said two impulse series alternately charge and discharge said second condenser in opposition to said first condenser so as to produce across said condensers opposite impulse-shaped voltages.

9. An arrangement for deriving a controlling quantity from the relative phase position of two impulse series having equal repetition frequencies, comprising, in combination, a first unidirectional conducting means; a second unidirectional conducting means connected in series with said first unidirectional conducting means so as to form a first junction; a source of common reference potential; a first condenser having two plates, one of said plates of said first condenser being connected to said common reference potential, the other of said two plates of said first condenser being connected to said first junction of said first and second unidirectional conducting means, said first junction being connected to said reference potential solely through said first condenser; a first coupling member connected to said first unidirectional conducting means, said first coupling member having an input terminal adapted to be connected to one of said two impulse series; a second coupling member connected to said second unidirectional conducting means, said second coupling member having an input terminal adapted to be connected to the other of said two impulse series with opposite polarity to said one of said two impulse series whereby said two impulse series alternately charge and discharge said first condenser so as to produce impulse-shaped voltages across said first condenser proportional to the mutual phase position of said two impulse series; a third unidirectional conducting means; a fourth unidirectional conducting means connected in series with said third unidirectional conducting means so as to form a second junction; a second condenser having two plates, one of said plates of said second condenser being connected to said common reference potential, the other of said two plates of said second condenser being connected to said second junction of said third and fourth unidirectional conducting means, said second junction being connected to said reference source solely through said second condenser; a third coupling member connected to said third unidirectional conducting means, said third coupling member having an input terminal adapted to be connected to said other of said two impulse sequences with opposite polarity; a fourth coupling member connected to said fourth unidirectional conducting means, said fourth coupling member having an input terminal adapted to be connected to said one of said two impulse sequences with opposite polarity, whereby said two impulse series alternately charge and discharge said second condenser in opposition to said first condenser so as to produce across said condensers opposite impulse-shaped voltages; a first tube having a grid connected to said first junction; a second tube having a grid connected to said second junction; and means responsive to the anode currents of said tubes.

10. An arrangement for deriving a controlling quantity from the relative phase position of two impulse series having equal series frequencies, comprising, in combination, a first unidirectional conducting means; a second unidirectional conducting means connected in series with said first unidirectional conducting means so as to form a first junction; a source of common reference potential; a first condenser having two plates, one of said plates of said first condenser being connected to said common reference potential, the other of said two plates of said first condenser being connected to said first junction of said first and second unidirectional conducting means, said first junction being connected to said reference potential solely through said first condenser; a first coupling member connected to said first unidirectional conducting means, said first coupling member having an input terminal adapted to be connected to one of said two impulse series; a second coupling member connected to said second unidirectional conducting means, said second coupling member having an input terminal adapted to be connected to the other of said two impulse series with opposite polarity to said one of said two impulse series whereby said two impulse series alternately charge and discharge said first condenser so as to produce impulse-shaped voltages across said first condenser proportional to the mutual phase position of said two impulse series; a third unidirectional conducting means; a fourth unidirectional conducting means connected in series with said third unidirectional conducting means so as to form a second junction; a second condenser having two plates, one of said plates of said second condenser being connected to said common reference potential, the other of said two plates of said second condenser being connected to said second junction of said third and fourth unidirectional conducting means, said second junction being connected to said reference source solely through said second condenser; a third coupling member connected to said third unidirectional conducting means, said third coupling member having an input terminal adapted to be connected to said other of said two impulse sequences with opposite polarity; a fourth coupling member connected to said fourth unidirectional conducting means, said fourth coupling member being fed with said one of said two impulse series with opposite polarity, whereby said two impulse series alternately charge and discharge said second condenser in opposition to said first condenser so as to produce across said condensers opposite impulse-shaped voltages; a first tube having a grid connected to said first junction; a second tube having a grid connected to said second junction; a polarized relay connected in the anode circuits of said first and second tubes; and a phase-correcting member actuated by said polarized relay.

11. An arrangement for deriving a controlling quantity from the relative phase position of two impulse series having equal repetition frequencies, comprising, in combination, a first unidirectional conducting means; a second unidirectional conducting means connected in series with said first unidirectional conducting means so as to form a first junction; a source of common reference potential; a first condenser having two plates, one of said plates of said first condenser being connected to said common reference potential, the other of said two plates of said first condenser being connected to said first junction of said first and second unidirectional conducting means, said first junction being connected to said reference potential solely through said first condenser; a first coupling member connected to said first unidirectional conducting means, said first coupling member having an input terminal adapted to be connected to one of said two impulse sequences; a second coupling member connected to said second unidirectional conducting means, said second coupling member having an input terminal adapted to be connected to the other of said two impulse series with opposite polarity to said one of said two impulse series whereby said two impulse series alternately charge and discharge said first condenser so as to produce impulse-shaped voltages across said first condenser serving as a criterion for the mutual phase position of said two impulse series; a third unidirectional conducting means; a fourth unidirectional conducting means connected in series with said third unidirectional conducting means so as to form a second junction; a second condenser having two plates, one of said plates of said second condenser being connected to said common reference potential, the other of said two plates of said second condenser being connected to said second junction of said third and fourth unidirectional conducting means, said second junction being connected to said reference source solely through said second condenser; a third coupling member connected to said third unidirectional conducting means, said third coupling member having an input terminal adapted to be connected to said other of said two impulse series with opposite polarity; a fourth coupling member connected to said fourth unidirectional conducting means, said fourth coupling member being fed with said one of said two impulse series with opposite polarity, whereby said two impulse series alternately charge and discharge said second condenser in opposition to said first condenser so as to produce across said condensers opposite impulse-shaped voltages; a first tube having a grid connected to said first junction; a second tube having a grid connected to said second junction; a polarized relay connected in the anode circuits of said first and second tubes; a motor controlled by said polarized relay; and means actuated by said motor for adjusting the phase of said two impulse sequences.

12. An arrangement for deriving a controlling quantity from the relative phase position of two impulse series having equal repetition frequencies, comprising, in combination, a first unidirectional conducting means; a second unidirectional conducting means connected in series with said first unidirectional conducting means so as to form a junction; a source of common reference potential; a condenser having two plates, one of said plates being connected to a common reference potential, the other of said two plates being connected to said junction of said unidirectional conducting means, said junction being connected to said reference potential solely through said condenser; a first coupling member connected to said first unidirectional conducting means, said first coupling member being fed with one of said two impulse series; and a second coupling member connected to said second unidirectional conducting means, said second coupling member having an input terminal adapted to be connected to the other of said two impulse series with opposite polarity to said one of said two impulse series whereby said two impulse series alternately charge and discharge said condenser so as to produce impulse-shaped voltages across said condenser proportional to the mutual phase position of said two impulse series, said first and second coupling members being connected to each other so as to form a junction adapted to be connected to an impulse series which is a superposition of said two impulse series.

References Cited in the file of this patent

UNITED STATES PATENTS

| 2,260,963 | Wilder | Oct. 28, 1941 |
| 2,500,839 | Lord | Mar. 14, 1950 |
| 2,557,636 | Crumrine | June 19, 1951 |
| 2,564,682 | Fisk et al. | Aug. 21, 1951 |
| 2,597,214 | Woodbury | May 20, 1952 |
| 2,679,187 | Bitting | May 25, 1954 |
| 2,683,802 | Williams | July 13, 1954 |